US008521495B2

(12) United States Patent
Ray et al.

(10) Patent No.: US 8,521,495 B2
(45) Date of Patent: Aug. 27, 2013

(54) CALCULATING LIQUID LEVELS IN ARBITRARILY SHAPED CONTAINMENT VESSELS USING SOLID MODELING

(75) Inventors: Stephen L. Ray, Algona, WA (US);
Thomas A. Grandine, Issaquah, WA (US); Jan H. Vandenbrande, Sammamish, WA (US); Douglas A. Carr, Everett, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 12/964,771

(22) Filed: Dec. 10, 2010

(65) Prior Publication Data

US 2012/0150517 A1    Jun. 14, 2012

(51) Int. Cl.
*G01F 17/00*    (2006.01)
*G06G 7/57*    (2006.01)
*G01F 23/00*    (2006.01)

(52) U.S. Cl.
USPC .................... 703/10; 702/50; 702/55

(58) Field of Classification Search
None
See application file for complete search history.

(56) References Cited

U.S. PATENT DOCUMENTS

| | | | | |
|---|---|---|---|---|
| 5,138,559 | A * | 8/1992 | Kuehl et al. | 702/55 |
| 6,029,514 | A * | 2/2000 | Adam et al. | 73/149 |
| 6,157,894 | A * | 12/2000 | Hess et al. | 702/55 |
| 7,149,628 | B2 * | 12/2006 | Herbstreit et al. | 702/55 |
| 2005/0165563 | A1 * | 7/2005 | Herbstreit et al. | 702/55 |
| 2006/0076430 | A1 * | 4/2006 | Lee | 239/10 |
| 2008/0195442 | A1 * | 8/2008 | Blagg et al. | 705/7 |

OTHER PUBLICATIONS

Ohanian, Osgar John "Mass Properties Calculation and Fuel Analysis in the Conceptual Design of Uninhabited Air Vehicles" Thesis, Virginia Polytechnic Institute and State University (2003) available at <http://scholar.lib.vt.edu/theses/available/etd-12122003-110057/>.*

Daguia, Marie and Ray Schumacher, "Fuel Analysis: Methods, Techniques, and Calibration", SAWE Paper 3233, Proceedings from 61st Annual Conference of SAWE, Virginia Beach, Virginia, (May 2002) available from <http://www.sawe.org/papers/3233>.*

Kolak, Doug, "Aircraft fuel system modelling and simulation—Flowmaster V7 Aerospace" YouTube video presentation titled: "Advanced Fuel Tanks" (Nov. 4, 2010) available at <http://www.youtube.com/watch?v=2EDRJJdxeJc>.*

(Continued)

*Primary Examiner* — Kamini S Shah
*Assistant Examiner* — Jay B Hann
(74) *Attorney, Agent, or Firm* — Ostrager Chong Flaherty & Broitman P.C.

(57) ABSTRACT

Systems and method for simulating liquid containment behavior. The system comprises a solid modeler and a non-linear equation solver. The nonlinear equation solver takes as input the solid model representation of the containment vessel from the solid modeler, a desired orientation in space, dynamic conditions (e.g., lateral acceleration) and an amount of liquid. To find the level of liquid in the vessel, the system solver iteratively performs successive Boolean subtractions using an infinite horizontal half-space that represents the liquid level of the vessel. The resulting sliced solid model is used to compute the volume of the liquid at that level. The iterative system solver terminates when the computed volume of the sliced containment vessel matches the specified volume of liquid (e.g., fuel) within a given tolerance. To accommodate dynamic situations, e.g., when acceleration is present, the horizontal liquid plane is replaced with a plane at an angle that corresponds to the total acceleration.

17 Claims, 9 Drawing Sheets

(56) References Cited

OTHER PUBLICATIONS

Tookey, R.M. et al., "Integrated Design and Analysis of an Aircraft Fuel System" presented RTO AVT Symposium, published in RTO-MP-089 (2002) available at <http://ftp.rta.nato.int/public//PubFullText/RTO/MP/RTO-MP-089///MP-089-14.pdf>.*

Flowmaster "Simulation Driven Fuel Systems Design" Case Study: Aerospace (2007) available at <www.flowmaster.com>.*

Roh et al., "Simulation of Sloshing in Fuel Tanks and Parametric Study on Noise reduction by Decreasing Impact Pressure," SAE Techn. Paper Ser., 2005-1-1913, 2005 SAE World Congress, Detroit, Michigan, Apr. 11-14, 2005.

Marivani et al., "Numerical Simulation of Structure Response Outfitted with a Tuned Liquid Damper," Computers and Structures, 87 (2009), pp. 1154-1165.

10-0709_ISR+WO_PCT-US2011-051110.pdf.

Lee and Requicha, "Algorithms for Computing the Volume and Other Integral Properties of Solids. I. Known Methods and Open Issues," Commun. ACM, vol. 25, No. 9, 635-641 (Sep. 1982).

Lee and Requicha, "Algorithms for Computing the Volume and Other Integral Properties of Solids. II. A Family of Algorithms Based on Representation Conversion and Cellular Approximation," Comm. ACM, vol. 25, No. 9, 642-650 (Sep. 1982).

Requicha, "Representations for Rigid Solids: Theory, Methods, and Systems," Computing Surveys, vol. 12, No. 4, 437-464 (Dec. 1980).

Requicha and Voelcker, "Boolean Operations in Solid Modeling: Boundary Evaluation and Merging Algorithms", Proc. IEEE, vol. 73, No. 1, 30-44 (Jan. 1985).

Lee and Requicha, Algorithms for Computing the Volume and Other Integral Properties of Solid Objects, Production Automation Report, TM-35a, The University of Rochester (Mar. 1981).

* cited by examiner

CALCULATING LIQUID LEVELS IN ARBITRARILY SHAPED CONTAINMENT VESSELS USING SOLID MODELING

BACKGROUND

This invention generally relates to systems and methods for simulating containment vessels (hereinafter "containers") containing liquid. Such systems are useful, for example, in design-phase engineering simulations of liquid fuel-carrying vehicles. Such systems may also have application in reducing the number of sensors in a fuel tank for determining fuel level, or in correlating liquid levels and volume amounts in geological formations such as water reservoirs and oil deposits.

It is known to compute fuel distributions in aircraft wings for different wing attitudes, different bank and yaw angles, and different wing deflections using rectangular sliced approximations of the interior shape of the wing. That known solution has the following disadvantages: (1) it is tied to a specific geometric shape and topology (i.e., a wing); (2) it requires extensively formatted and reduced geometric representations of structural inputs to function; (3) it uses approximate solution methods and therefore does not provide an accurate solution; (4) the existing software is written in FORTRAN, which is complex, hard to maintain and hard to enhance; (5) the existing software is hard to integrate with other solutions (e.g., computation of an airplane's center of gravity subject to different flight angles); (6) analysis results are exchanged through proprietary file formats that require custom coding to read and write.

There is a need for improved systems and methods for accurately computing liquid levels (also referred to herein as "liquid surface plane locations") for an arbitrarily shaped containment vessel at different spatial orientations in static or dynamic situations (e.g., the containment vessel is accelerating in a particular direction).

BRIEF SUMMARY

The present invention is directed to systems and methods for calculating liquid levels in arbitrary complex-shaped containers (e.g., fuel tanks) using solid modeling techniques. Solid modeling encompasses a body of theories, techniques and systems focused on representations that permit well-defined geometric properties of a represented solid to be calculated automatically. Many schemes for representing solids unambiguously are known. Boundary representations are graphs whose nodes represent faces, edges and vertices, and whose links represent incidence and adjacency relations. Most solid modelers provide support for Boolean operations on solid objects. Boolean operations are used in solid modeling to define solid objects through additions and subtractions of parameterized solid primitives such as cubes, cylinders and other boundary representations.

To utilize solid modeling, application algorithms are needed which operate on representations of solids. Geometric algorithms manipulate data (symbol structures) which represent solids. In particular, algorithms are well known for computing the volume, moments of inertia, and other properties of geometrically complex solids.

The embodiments disclosed herein use boundaries to represent fuel tanks, but the present invention is not limited to exclusively using boundary representations of fuel tanks. The embodiments disclosed herein also use solid modeling Boolean operations to create a system for determining liquid levels in arbitrary complex-shaped containers using exact computations on exact geometry. These embodiments leverage solid modeling Boolean operations to reduce the amount of code by one order of magnitude. These embodiments do not rely on approximations. Given a volume of liquid and an arbitrarily shaped containment vessel, the disclosed embodiments greatly simplify the computation of liquid levels and other properties such as the amount of usable and unusable liquid at different vessel orientations, accessibility of the liquid, exposed surface area and wetted surface area, height of the liquid at any location in the vessel, and volume transfer with vessel orientation changes.

In accordance with embodiments disclosed herein, the simulation system comprises a processor programmed with software that uses solid modeling Boolean operations in combination with a nonlinear equation solver to compute the liquid level in an arbitrarily shaped containment vessel, e.g., the fuel level in an aircraft wing.

More specifically, in accordance with one embodiment, a solid modeler outputs a boundary representation of a containment vessel to a nonlinear equation solver. The solid model of the containment vessel represents a shape by its boundary, which consists of a set of faces that are joined together at common edges to form a "watertight" enclosure of space.

The nonlinear equation solver takes as input the solid model boundary representation of the containment vessel, a desired orientation in space, dynamic conditions (e.g., lateral acceleration) and an amount of liquid. To find the level of liquid in the vessel, the system solver iteratively performs successive Boolean subtractions using an infinite horizontal half-space (or other shaped half-space) that represents the liquid level of the vessel. The resulting sliced solid model is used to compute the volume of the liquid at that level.

The iterative system solver terminates when the computed volume of the sliced containment vessel matches the specified volume of liquid (e.g., fuel) within a given tolerance. The result of the system solver is a solid model boundary representation of the liquid that corresponds to the given volume. To accommodate dynamic situations, e.g., when acceleration is present such as in a turn or climb, the horizontal liquid plane is replaced with a plane at an angle that corresponds to the total acceleration.

In accordance with another embodiment, the simulation system is designed to accommodate containment vessels with interior baffles that form compartments or bays connected by narrow orifices in the baffles. The liquid level height computation (as previously described) is first applied to each individual compartment (i.e., bay) to compute initial liquid heights. Next, the head, which is the pressure produced by differences in liquid levels between two commutating vessels, is computed between each pair of connected bays. This information is then used to compute how the liquid flows between the bays to level out the liquid levels.

The solid model representations of the liquid and the containment vessel can be used to greatly facilitate deriving vessel properties, such as: (1) the exposed liquid area, which is simply the area of the top faces of the solid model (this property is important for estimating evaporation; (2) the wetted area (the area which is touched by liquid) by computing the areas of all the faces of the solid model representation of the liquid that touches the vessel faces; (3) dip stick levels (the amount a dipstick is submerged in liquid) by intersecting a solid model representation of the dipstick with the solid model representation of the liquid (this is used to calibrate the dip sticks to indicate the volume of liquid); (4) the amount of liquid trapped by compartments; (5) the amount of liquid transferred from one compartment to another when the orientation of the vessel changes; and (6) the weight distribution of the fluid in the containment vessel.

The software functionality disclosed herein provides a general method for computing liquid levels in arbitrarily shaped containers. Because the software is not tied to a specific shape or topology (how things are connected), it can be used in different applications, such as liquid levels in aircraft and automobile fuel tanks, water tanks and radiators, rocket propellant levels, etc.

This software leverages solid modeling Boolean operations to reduce the amount of code by one order of magnitude. This in turn greatly reduces needed software maintenance.

Further, the liquid-level calculating software does not rely on approximations. Because no approximations are performed, the solutions are more accurate.

Also the software it is embeddable in other software solutions. Because the solution is embeddable, the need to transfer analysis results in different formats is eliminated.

The software uses the actual CAD definition of the geometry of a containment vessel rather than a discretized "stick figure" approximation of the geometry. Because the software operates directly on geometry, many data conversion issues are eliminated.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of a system for modeling and simulating the behavior of liquid inside a fuel tank under dynamic conditions will now be described.

Figure 1:
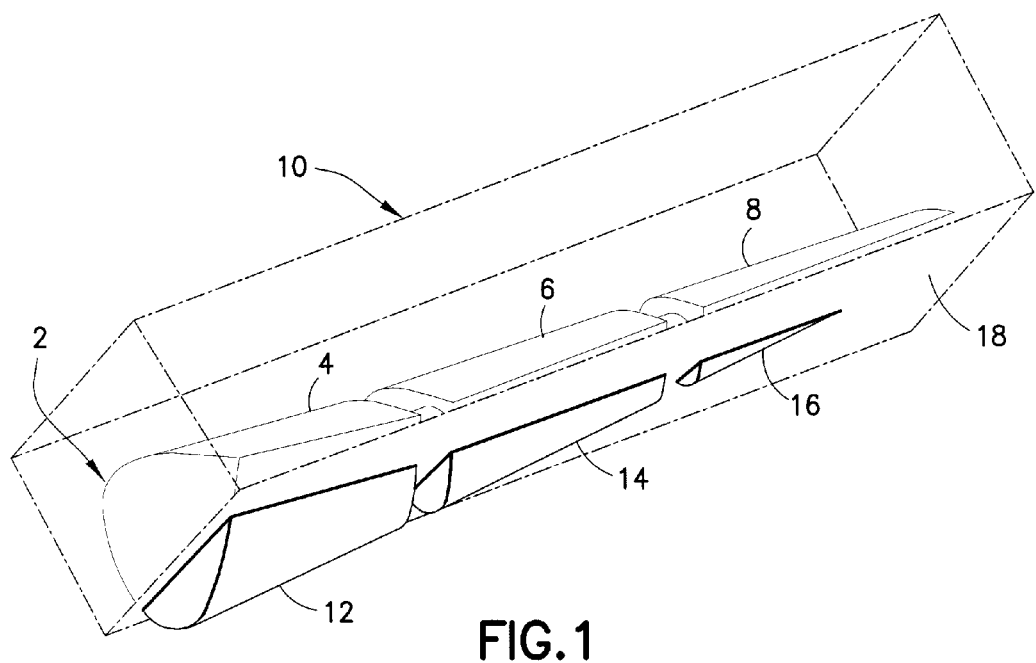
FIG. 1 is a solid model representation of a containment vessel intersected by a face of another solid model representation, which face represents the level of liquid in the containment vessel as determined by an algorithm in accordance with one embodiment. An angled viewpoint has been chosen for clarity.

FIG. 1 is a solid model representation of a wing 2 comprising compartments 4, 6 and 8 for storing fuel. In accordance with one embodiment of the invention, the solid model representation of wing 2 is intersected by a face 18 of an infinite horizontal half-space 10, which face 18 represents the level of fuel (i.e., the level of the surface plane of the fuel) inside the wing 2 given a 15% volume fill. An angled viewpoint was chosen for clarity.

Figure 2A:
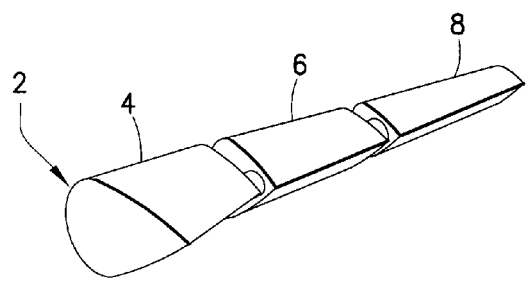
FIG. 2A is a solid model representation of a conceptual wing of an aircraft.
Figure 2B:
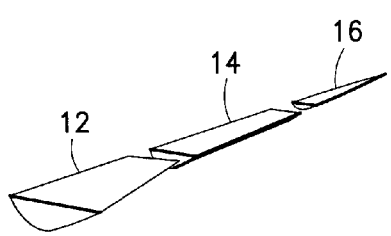
FIG. 2B is a solid model representation of a 15% volume fill of liquid in the wing represented in FIG. 2A, produced by the same algorithm used to produce FIG. 1.

As shown in FIG. 2A, compartment 4 of wing 2 is in fluid communication with compartment 6 via an orifice, and compartment 6 is in fluid communication with compartment 8 via an orifice. FIG. 2A shows wing 2 with a 0° bank angle. In contrast, FIG. 2B is a solid model representation of the volumes of fuel inside the wing 2 at a 0° bank angle for a 15% volume fill. As seen in FIG. 2B, the fuel volume inside the fuel tank compartments comprises respective fuel volumes 12, 14 and 16. As best seen in FIG. 1, fuel volume 12 is contained by compartment 4; fuel volume 14 is contained by compartment 6; and fuel volume 16 is contained by compartment 8.

As will be disclosed in more detail later, a processor is programmed with software which performs an algorithm for determining the location and orientation of face 18 (representing the fuel level) as a function of the solid model representation of wing 2, the spatial orientation of wing 2, the amount of fuel contained inside wing 2, and the dynamic conditions (e.g., acceleration of the wing) affecting the fuel inside wing 2.

Figure 3A:
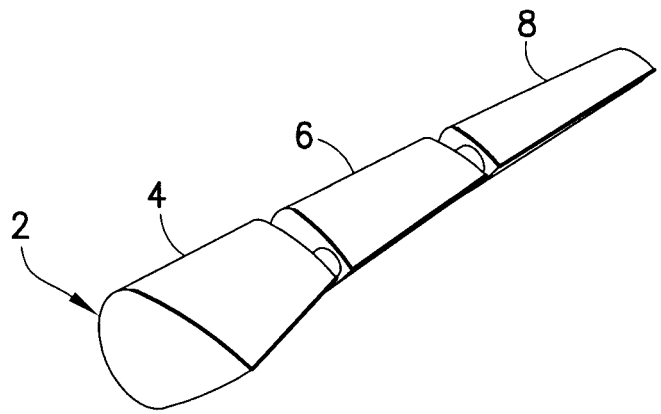
FIG. 3A is a solid model representation of a conceptual wing with a 9-degree bank angle.
Figure 3B:
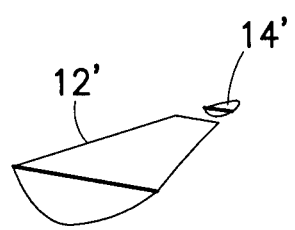
FIG. 3B is a solid model representation of a 15% volume fill of liquid in the wing represented in FIG. 3A, produced by the same algorithm used to produce FIG. 1.

For example, as the bank angle of the wing 2 changes, the position of fuel inside wing 2 changes. FIG. 3A is a solid model representation of the same wing 2 with a 9-degree bank angle, whereas FIG. 3B is a solid model representation of the volumes of fuel inside wing 2 at a 9° bank angle for a 15% volume fill. As seen in FIG. 3B, the fuel volume inside the fuel tank compartments 4 and 6 comprises respective fuel volumes 12' and 14'. There is no fuel in compartment 8 for the spatial orientation shown in FIG. 3A and with a 15% fill.

Figure 4A:
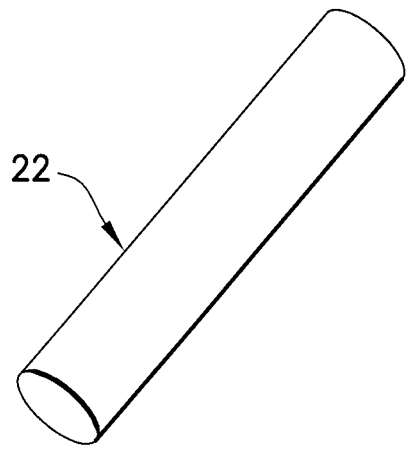
FIG. 4A is a solid model representation of a cylindrical containment vessel.
Figure 4B:
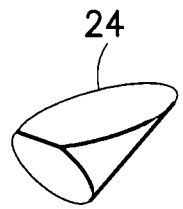
FIG. 4B is a solid model representation of a 15% volume fill of liquid in the cylindrical containment vessel represented in FIG. 4A, produced by the same algorithm used to produce FIG. 1.

FIG. 4A is a solid model representation of a cylindrical containment vessel 22 oriented at an angle of 45 degrees. FIG. 4B is a solid model representation of a 15% volume fill of liquid 24 contained by the cylindrical containment vessel 22 represented in FIG. 4A, produced by the same algorithm used to produce the images seen in FIGS. 1, 2A, 2B, 3A and 3B. This demonstrates the generic nature of the algorithm.

Figure 5:
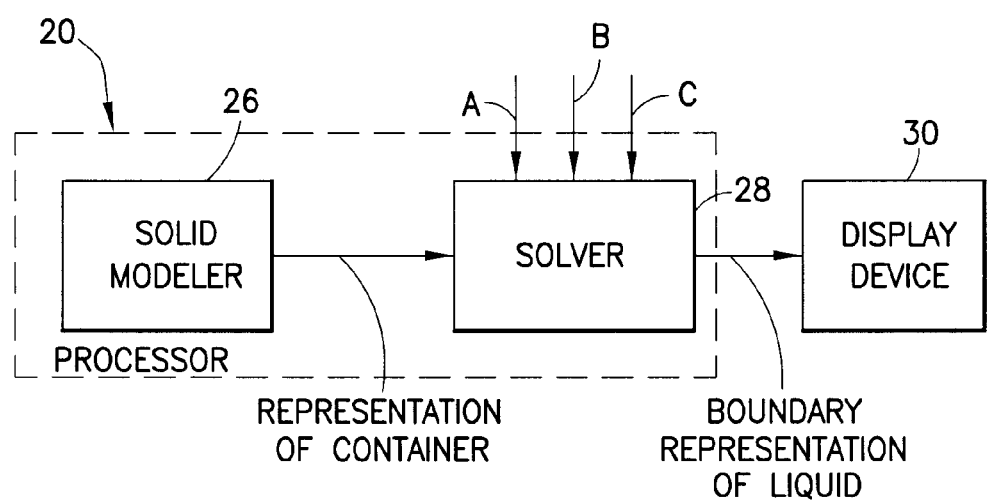
FIG. 5 is a block diagram representing components of a system for calculating the liquid level in a containment vessel in accordance with one embodiment of the invention.

FIG. 5 is a block diagram representing components of a system for calculating and displaying the liquid level in a containment vessel in accordance with one embodiment of the invention. The system comprises a processor 20 programmed with solid modeler software 26 that uses solid modeling Boolean operations and a nonlinear equation solver 28 that computes the liquid level in an arbitrarily shaped containment vessel, e.g., the fuel level in an aircraft wing. The solid modeler 26 outputs a boundary representation of a containment vessel to nonlinear equation solver 28. The solid model of the containment vessel represents a shape by its boundaries, which consist of a set of faces that are joined together at common edges to form a "watertight" enclosure of space. The nonlinear equation solver 28 takes as input the solid model boundary representation of the containment vessel, a desired orientation in space (input A in FIG. 5), dynamic conditions (e.g., lateral acceleration) (input B in FIG. 5) and an amount (i.e., volume) of liquid contained therein (input C in FIG. 5). To find the level of liquid in the containment vessel, the system solver 28 iteratively performs successive Boolean subtractions using an infinite horizontal half-space (e.g., item 10 in FIG. 1) that represents the liquid level inside the vessel. The resulting sliced solid model is used to compute the volume corresponding to the liquid at that level. The iterative system solver 28 terminates when the computed volume of the sliced containment vessel matches the specified volume of liquid (e.g., fuel) within a given tolerance. The result of the system solver is a solid model boundary representation of the computed volume of liquid. To accommodate dynamic situations, e.g., when acceleration is present such as in a turn or climb, the horizontal liquid surface plane is replaced with a plane at an angle that corresponds to the total acceleration. This final boundary representation of the liquid under dynamic conditions is then output to a display device 30, which displays an image of the solid model of the containment vessel intersected by a horizontal liquid surface plane (e.g., as shown in FIG. 1).

Figure 6:
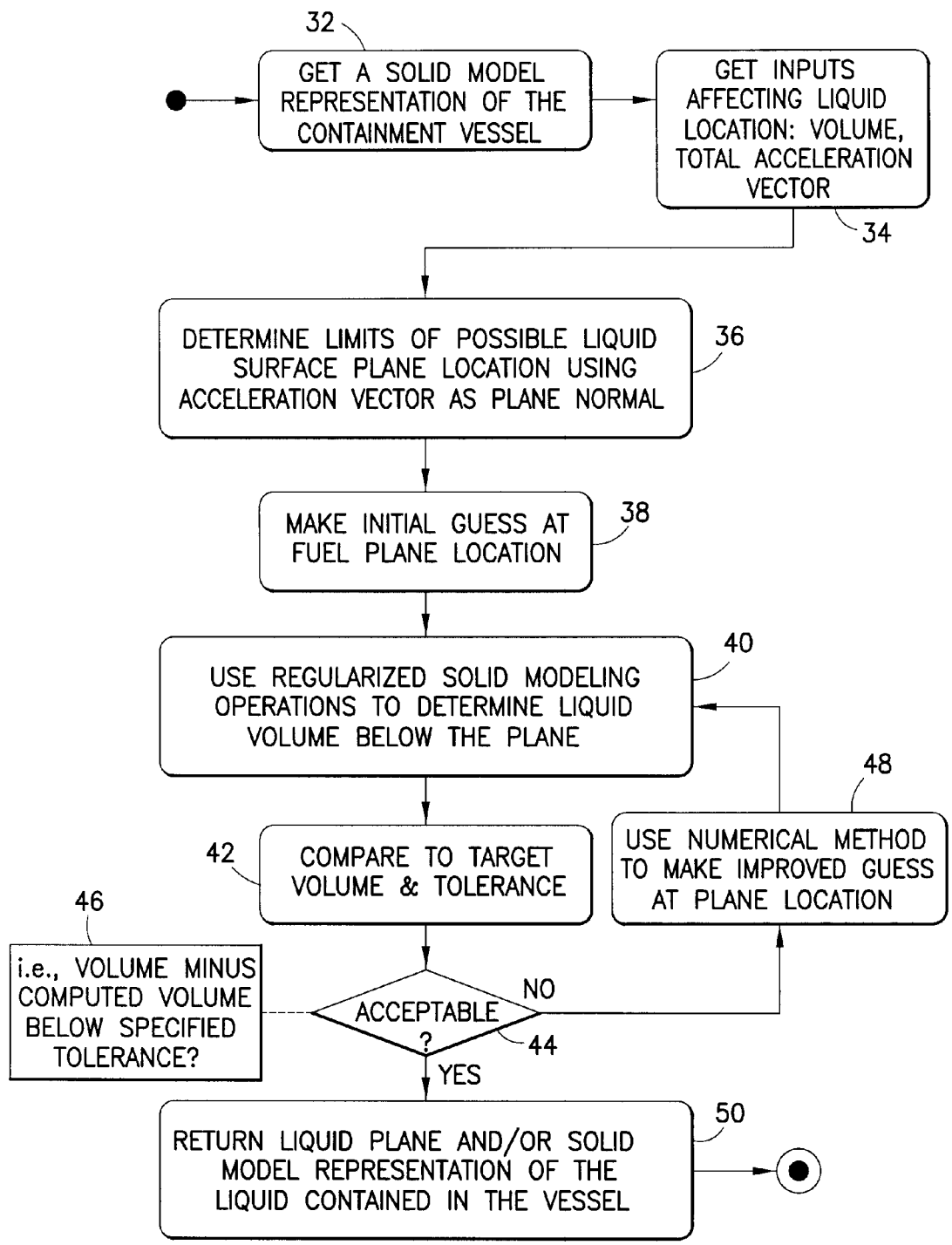
FIG. 6 is a flowchart showing an algorithm performed by the system depicted in FIG. 5.

FIG. 6 is a flowchart showing an algorithm performed by the system depicted in FIG. 5. In step 32, the processor retrieves a solid model boundary representation of the containment vessel from memory. In step 34, the processor retrieves additional data from memory. In accordance with a preferred embodiment, the additional data includes at least the following: the spatial orientation of the containment vessel; the amount (i.e., target volume) of liquid in the containment vessel; and the magnitude and direction of acceleration (i.e., total acceleration vector) of the containment vessel. In step 36, the processor determines the limits of a possible location of the liquid surface plane, the limits being a function of the spatial orientation, target volume and acceleration vector (i.e., the acceleration vector is normal to the liquid surface plane).

The tool can perform methods for determining the limits of a solid, i.e., the minimum and maximum x, y and z values of its boundaries. These limits can be thought of as two points defining opposing corners of a "bounding box" which contains the solid. Under conditions where only gravity is acting on the liquid—i.e., total acceleration is perfectly aligned with the "inertial" z-direction—the liquid limits are the z-limits of the solid. In cases where additional aircraft accelerations cause the total acceleration vector to no longer align with the z-direction, the container is first temporarily rotated until its total acceleration vector aligns with the inertial z-direction. Then the tool finds the limits of the rotated solid, defining a rotated "bounding box." The rotated solid is discarded, and the limits of its bounding box are rotated back to the original "inertial" coordinate system, where a ray drawn between them contains the range of locating points for a liquid plane aligned with the acceleration vector.

More specifically, the limits are based on the bounding box computation of the solid model, with the bounding box oriented along the axis of the current coordinate system (e.g., the x-y plane represents the "horizontal" plane, the "z" component the height in the "vertical" direction—with "vertical" meaning the direction of gravity plus whatever factor to accommodate other accelerations). How to compute the bounding box of a solid model is well known, although there are various degrees of tightness of the "box" that surrounds the solid model. The "z" component is the limit used by the embodiments disclosed herein.

The disclosed embodiments compute a bounding box of a boundary representation by computing the bounding boxes of all the underlying surfaces of the faces of the boundary representation, and then "combine" the boxes by computing the collective minima and maxima of the extreme points of the boxes in each coordinate direction. Consequently, the bounding box can be a bit loose, but for the sake of the computations performed, it does not matter.

So the problem reduces to finding the bounding boxes of surfaces, for which there exist a variety of published methods. The disclosed embodiments uses tensor product splines to represent the surfaces and uses the bounds of the control polygon for polynomial splines (rational ones are more complex). However, this is just one exemplary embodiment and there are other published ways to compute bounding boxes. Various methods for computing bounding boxes are disclosed in the Handbook of Computer Aided Geometric Design, G. Farin et al. (editors), Elsevier B. V., Chapter 13—Interrogation of Subdivision Surfaces, M. Sabin (2002).

In step 38, the processor makes a first guess (i.e., an N-th guess, wherein N=1) concerning the liquid surface plane location by linear interpolation, such first guess being located between the limits previously determined in step 36. Then the processor uses regularized solid modeling (i.e., Boolean) operations to determine the volume of liquid below the liquid surface plane location in accordance with the first guess (see step 40 in FIG. 6). The processor then compares the liquid volume as determined in step 40 to the target volume (step 42) and determines whether the difference therebetween is acceptable (step 44). The test applied is whether the difference between the computed volume and the target volume is within a user-specified tolerance (block 46 in FIG. 6). If the difference is not acceptable, a numerical method (e.g., a Newton-Raphson-like method) is used to make an improved guess as to the liquid surface plane location (step 42). Using this improved guess, steps 42 and 44 are repeated. If the improved guess is unacceptable (step 42), then steps 48, 40 and 42 are repeated until the difference between the computed and target volumes is acceptable. If the difference is acceptable (step 44), the processor stores image data representing the final guess as to the liquid surface plane location and/or a solid model boundary representation of the computed volume of liquid in the vessel, the upper face of the solid model boundary representation being the aforementioned liquid surface plane (step 50). The processor also sends the image data to a display device (e.g., a computer monitor) for display.

The numerical method for guessing the liquid surface plane location comprises finding successively better approximations to the zero of a function equal to a difference between the volume of liquid below the current guess for the liquid surface plane location and the volume of liquid represented by said liquid volume data. The set of possible zero-finding methods includes both polynomial-based and derivative-based methods known in the art. Different applications might find benefit from any number of different approaches.

Referring still to FIG. 6, the iterations represented by steps 40, 42, 44 and 48 can be based on different, but fundamentally equivalent approaches. For example, a first version of source code subtracts a large block from a simulated wing to eliminate "empty space" using a regularized Boolean operator:

cutsolid=solid−cutblock·Translate([0,0,zrange*delta/ 10.0])

where "−" is overloaded to mean regularized Boolean subtraction on solid BRep (boundary representation) objects. A second version uses a "Cut" command, which cuts a solid with an infinite plane and only keeps the portion of the solid along the positive normal of the plane. Both versions achieve the same objective using different methods, and are both considered standard solid modeling operations.

The work horses of the first version are a function cutWing (solid, hgt), which cuts an arbitrary solid at its given orientation with a large block at a given z-value (i.e., height), and a function findwl(solid, volume), which uses a Newton-Raphson-like iteration to find the fuel level given a solid model of a containment vessel and the volume of the fuel. In essence it starts with a guess of the level and then iteratively refines the level by computing the volume of the sliced solid model given a particular level.

The disclosed embodiments of the invention apply solid modeling techniques inside of a Newton method applied to finding fuel levels. However, a Newton-Raphson-like method is just one possible way of solving this particular problem, i.e., find a height such that $$\text{Volume(containment\_solid}-\text{*big\_block at } z=\text{height})-\text{given\_volume} \leq \epsilon$$

where −* denotes regularized Boolean subtraction, $\epsilon$ is set to a small number (due to limited accuracies of floating point computations and limited computational resources), and big_block is a rectangular box with the bottom face parallel to the ground (conceptually) and sized such that it is bigger than the containment vessel represented by containment_solid. An infinitely large half-space (as seen in FIG. 1) would work also. For some implementations, $\epsilon$ was set to 0.001 to 0.0001. Choosing a number too small leads to unstable Newton-Raphson behavior (or long computational times).

The function cutWing(solid, hgt) takes as input a solid model represented as a BRep ("solid") of a containment vessel (fuel tank, bottle, septic tank, etc.) and a height parameter "hgt" represented as a real value. The height value "hgt" represents the level of liquid in the containment vessel, which means that the solid and the height value both reference a common (and arbitrary) origin. We also assume the presence of gravity (or an external force), which means that the direction of the force will be normal to the surface plane of the liquid in the containment vessel. In this implementation, we also assume the liquid is "at rest" and not sloshing around.

The cutWing routine uses the height value to return a solid model that represents the space occupied by the liquid in the containment vessel. Conceptually, it does this by creating an infinite plane, slicing the solid with this plane and keeping the portion that is in the positive gravitation direction. In one version, it is assumed that the containment vessel is significantly smaller than the circumference of the planet, and the level of liquid in the containment vessel can be regarded as being planar. However, this can be trivially extended to encompass vessels that are large relative to the size of the planet by using a sphere (or other shapes) centered at the heavenly body's center, and adjusting the radius according to relative position of the vessel with respect to the common origin.

In the cutWing routine, this operation was implemented by creating a solid model representation of a large rectangular block, sized so that it is larger than the containment vessel, and then positioning the block at the given height. Regularized Boolean operations were used to subtract the block from the containment vessel to get a solid model representation of the liquid contained within the vessel. It should be noted that in some cases, this will return nothing if the level is below the containment vessel, or this will return the entire containment vessel if the level is above the vessel.

The cutWing routine also implements a slight "delta" wiggle to the height variable in case the Boolean operation at the prescribed level fails. It basically wiggles the block up and down with small increments of "zrange" until a successful computation is returned. zrange is set at 1% of the maximal height of the vessel. Typically, failures of Boolean operations are caused by problems handling the cutting surface being coincident with a face of a boundary representation. Boolean operations rely on computing many intersections between surfaces, and when two surfaces are partially coincident, the number of solutions goes to infinity (i.e., instead of one or more curves, one gets infinitely many curves, i.e., a subset of the surfaces). The disclosed system (and most CAD systems) have special code to detect the most common coincidences, but there are many cases where the Boolean operation will fail. Of course, there are many other reasons why a Boolean operation may fail (e.g., bugs), and the perturbation trick allows a recovery from those errors. It is also a fairly common technique employed by most solid modeling systems internally.

The findwl(solid, volume) function uses the following parameters to find the fuel level: hlow, a variable to store the current lower bound of the height (hlow=zlower); vlow, a variable to store the current lower bound of the volume of the vessel vlow=0); hhigh, a variable to store the current upper bound of the height (hhigh=zupper); vhigh, a variable to store the current upper bound of the volume of the vessel (vhigh=total); hmed, the average of hlow and hhigh [hmed=abs(hhigh−hlow)*0.5+zlower]; vmed: the volume of the liquid at hmed [vmed=cutWing(solid, hmed).Volume( )].

The function Volume( ) is a routine (defined on solid models) that computes the volume contained by the space enclosed by the faces of the solid model. A boundary representation of a volume is represented by a collection of faces that meet at common edges and create a "leak"-proof enclosure of space. The function Area( ) is a routine that computes that area of the portion of the surface defined by the "trimming curves" that define a subset of the surface. Area( ) is used to compute the wetted area of the vessel, which represents that portion of the total area of the vessel which is contacted by liquid, as well as the area of the "top" surface of the liquid (which is used to determine evaporation rates and such).

The foregoing algorithm uses the actual CAD definition of the geometry of a fuel tank rather than a discretized "stick figure" approximation of the geometry. To compute the liquid level, the algorithm uses exact solid modeling operations directly on the original design geometry. Solid regularized Boolean operations perform the necessary intersections between the geometry followed by classification to determine which pieces of the intersected surfaces to keep.

As previously mentioned, many schemes for representing solids unambiguously are known. For example, the use of boundaries to represent a solid object is disclosed by Requicha in "Representations for Rigid Solids: Theory, Methods, and Systems", ACM Computing Surveys, Vol. 12, No. 4, pp. 437-464 (December 1980). In addition, Boolean operations are used in solid modeling to define solid objects through additions and subtractions of parameterized solid primitives such as cubes, cylinders and other boundary representations. For example, the use of Boolean subtractions to define solid objects is disclosed by Requicha and Voelcker in "Boolean Operations in Solid Modeling: Boundary Evaluation and Merging Algorithms", Proceedings of the IEEE, Vol. 73, No. 1, pp. 30-44 (January 1985).

In accordance with another embodiment, the simulation system is designed to accommodate containment vessels with interior baffles that form compartments or bays connected by narrow orifices in the baffles. The liquid level height computation (as previously described) is first applied to each individual compartment (i.e., bay) to compute initial liquid heights. Next, the head, which is the pressure produced by differences in liquid levels between two commutating vessels, is computed between each pair of connected bays. This information is then used to compute how the liquid flows between the bays to level out the liquid levels.

One implementation of this embodiment utilizes Simulink® and MATLAB® software, commercially available from Mathworks, in conjunction with solid modeling software capable of representing solid objects as boundary representations. MATLAB® is a numerical computing environment and programming language. MATLAB® allows matrix manipulations, plotting of functions and data, and implementations of algorithms. Simulink® is a tool for modeling, simulating and analyzing multidomain dynamic systems. Simulink® is tightly integrated with the MATLAB® environment and can either drive MATLAB® or be scripted from it.

In describing its physical modeling tools, MathWorks has stated that Simscape™ extends Simulink® with tools for modeling systems spanning mechanical, electrical, hydraulic, and other physical domains as physical networks. It provides fundamental building blocks from these domains to let you create models of custom components. The MATLAB®based Simscape™ language enables text-based authoring of physical modeling components, domains, and libraries. The embodiments of the invention disclosed herein utilize Mathworks' physical modeling tools, but other physical modeling tools can be utilized.

In accordance with one embodiment of the invention for simulating flow between a series of compartments or bays of a fuel tank that communicate via orifices, the solver 28 (see FIG. 5) comprises multiple subsystems, including a respective fuel volume subsystem for calculating the liquid level in each bay and a respective connection subsystem (using standard Mathworks-provided blocks) for calculating the flow rate through each orifice as a function of differing liquid levels in each bay. [These subsystems comprise respective sets of instructions executed by a processor.] It should be appreciated, however, that the invention is not limited to the case where the interconnecting element is an orifice. In real applications, there are a number of other types of interconnections between tanks, such as valved openings, tubes, tube runs that pass through pumps, valves, and other devices, etc., that can be simulated.

For the purpose of illustration, exemplary subsystems for calculating the liquid levels in two at least partially filled fuel tank bays and the rate of liquid flow through an orifice connecting those bays will now be described. These calculations can be extended to encompass a simulated fuel tank having a sequence of at least three communicating bays, each bay being at least partially filled with liquid fuel. The same procedures can be conducted between any multiple of solid objects, with any multiple of interconnecting elements.

Figure 7:
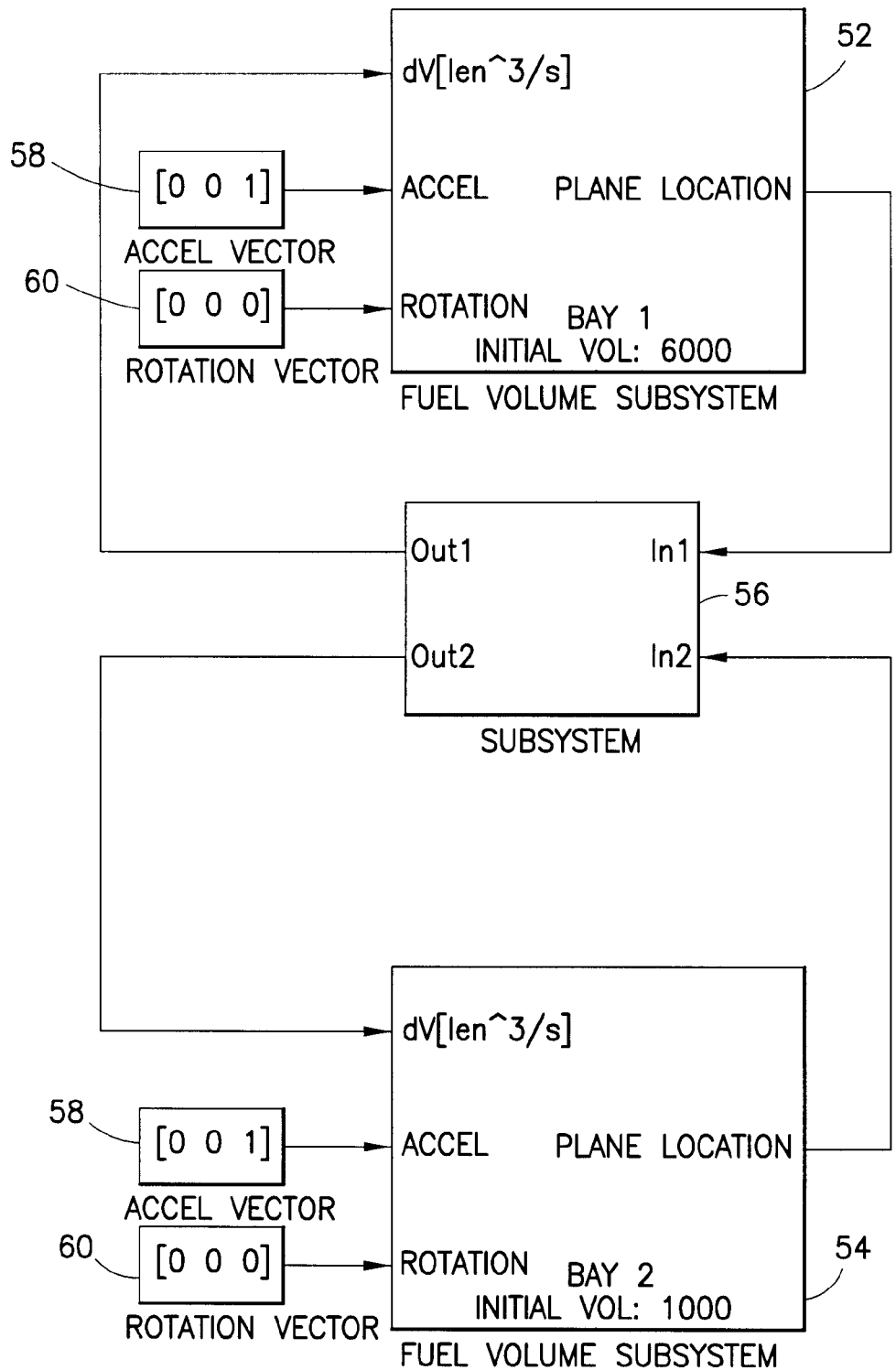
FIG. 7 is a top level model diagram representing two liquid volume subsystems (each representing a respective liquid-containing compartment or bay) interfaced through a connection subsystem that performs liquid flow rate calculations in accordance with a further embodiment of the invention.

FIG. 7 is a top level simulation model diagram representing two fuel volume subsystems 52 and 54 (corresponding to respective liquid-containing compartments or bays connected by an orifice) interfaced through a third subsystem 56 that contains connection information. Each fuel volume subsystem 52, 54 represents the liquid fuel contained in a respective bay or compartment and is interfaced to a respective unique solid object (initiated using solid modeling software) that represents that same respective bay or compartment within a fuel tank. The connection subsystem 56 performs liquid flow rate calculations simulating the flow of liquid from one bay to the other via the orifice. In accordance with one implementation, connection subsystem 56 uses only standard Mathworks-provided blocks.

In accordance with the implementation being described, each fuel volume subsystem interacts with a solid object that represents a tank or a single bay within a fuel tank. These objects should be loaded in the Simulink® workspace as an array with names "Bays". The initial conditions for each fuel volume subsystem can be inputted by the simulation operator using a pop-up window on a computer display. This pop-up window has two parameter fields respectively named "Bay Number" and "Initial Volume". If there are multiple bays in the array, each bay needs to be configured with a respective initial volume of liquid. The bay number for the bay being configured is entered into the field named "Bay Number". If there is only one object, "Bay Number" should be set to 1. The parameter "Initial Volume" sets the initial fuel volume for the simulation in the units [len^3], where "len" is the unit used to define the solid. For example, if the solid was defined in inches, set the initial fuel volume in in^3. Also the same units are used to define the flow rate into the bay on the input port "dV [len^3/s]".

Still referring to FIG. 7, each fuel volume subsystem 52, 54 receives acceleration vector data 58 representing a vector of an acceleration of the containment vessel being simulated and rotation vector data 60 representing a vector of a spatial orientation (i.e., rotation relative to a frame of reference) of the containment vessel being simulated. Fuel volume subsystem 52 further receives data from an output port Out1 of connection subsystem 56, while fuel volume subsystem 54 receives data from output port Out2 of connection subsystem 56. The data output Out1 is the rate of liquid flow dV (in units of volume per second) into or out of Bay 1 as calculated by connection subsystem 56 during the simulation of liquid flow from one of Bays 1 and 2 to the other bay via a circular orifice having a specified diameter, while the data output Out2 is the rate of liquid flow dV into or out of Bay 2 as calculated by connection subsystem 56 during the same simulation. If the initial volume of liquid in Bay 1 is greater than the initial volume of liquid in Bay 2, then liquid will flow from Bay 1 into Bay 2; alternatively, if the initial volume of liquid in Bay 1 is less than the initial volume of liquid in Bay 2, then liquid will flow from Bay 2 into Bay 1. In either case, the flow rates for Bays 1 and 2 will be equal in magnitude and opposite in direction. In the specific example depicted in FIG. 7, the initial volume inside Bay 1 is 6000 while the initial volume inside Bay 2 is 1000.

Each fuel volume subsystem routes inputs into a Simulink® "S-Function" block. This provides the interface to the corresponding solid object by executing custom embedded code. This S-Function code comprises a definition file named sFun_tank.m which is implemented in a standard Mathworks template. The relevant bit of custom code calls a function "find FuelPlane" that operates on a solid object. One line in sFun_tank.m is:

block·OutputPort(1)·Data=findFuelPlane(rot, volume, 1, . . . normal)

findFuelPlane is the key operation. The input "rot" is a pointer to a solid object having a specified spatial orientation. "volume" is a numerical double representing the current volume of liquid inside of "rot". "normal" is a three-dimensional vector of numerical doubles representing the total acceleration vector acting on the liquid. The function findFuelPlane returns a three-dimensional vector of numerical doubles that are a locating point for the liquid surface plane, i.e., a plane defined by [point, normal].

Referring again to FIG. 7, the flow through a circular orifice (of a specified diameter and at a specified height) in the partition between Bays 1 and 2 is simulated using standard Simulink® components. The "volume" inputs to the findFuelPlane function are changed as liquid flows from one bay to the other. During the simulation, the liquid level determined by the solid modeling software is used to determine the liquid "head" pressure above the orifice on each side of the partition. The differential pressure due to uneven fuel levels drives flow through the orifice until the levels equalize.

Upon initialization of the simulation system, the fuel volume subsystem 52 calculates the initial location of the surface plane of the liquid inside Bay 1 as a function of the solid model object representing Bay 1, the initial volume of liquid in Bay 1, and the acceleration and rotation vectors, and outputs that data to input port In1 of connection subsystem 56; and the fuel volume subsystem 54 calculates the initial location of the surface plane of the liquid inside Bay 2 as a function of the solid model object representing Bay 2, the initial volume of liquid in Bay 2, and the same acceleration and rotation vectors, and outputs that data to input port In2 of connection subsystem 56. At the same time, solid model boundary representations of and initial liquid levels in Bays 1 and 2 can be displayed on a display device.

Figure 8:
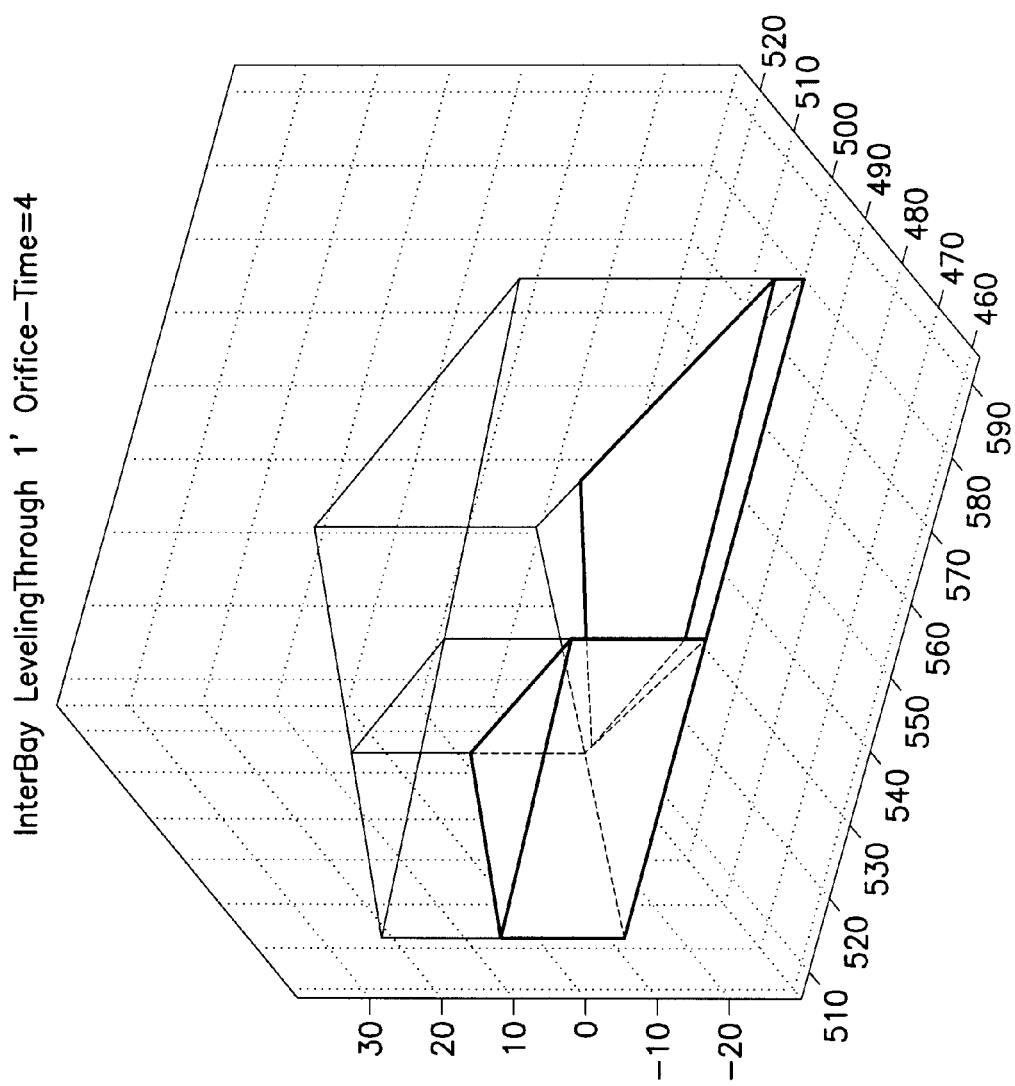
FIG. 8 is a three-dimensional illustration showing liquid level computations applied to two communicating vessels at the start of a simulation.

FIG. 8 is a static image of the two solid objects and their contained liquid volumes. The image represents the initial conditions of the simulation. The boldfaced lines represent the boundaries of the liquid volumes in the respective bays, while the non-boldfaced lines represent the solid walls of the respective bays which bound the respective liquid-containing interior volumes. Not shown is a small circular orifice between the bays that allows liquid to pass from one bay to the other.

Based on the solid model objects representing Bays 1 and 2, the initial liquid levels in Bays 1 and 2, and the area of the orifice via which Bays 1 and 2 communicate, connection subsystem 56 calculates the head, which is the pressure produced by differences in liquid levels between Bays 1 and 2. This information is then used to compute the rate at which liquid flows between the bays to level out the liquid levels. As the difference in liquid levels decreases, so does the flow rate, until finally the flow rate equals zero when the simulated liquid levels in Bays 1 and 2 become equal, as depicted in FIG. 9.

Figure 9:
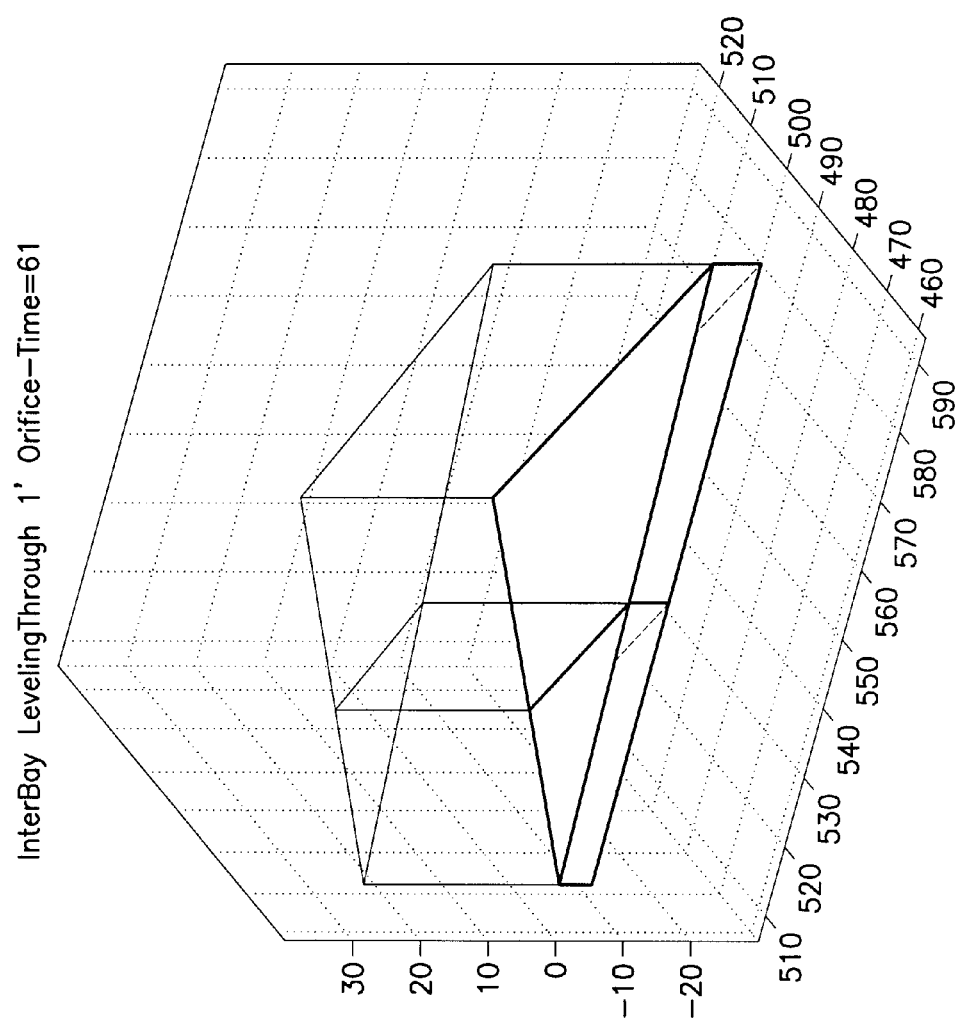
FIG. 9 is a three-dimensional illustration showing leveling of liquid between two communicating vessels after the levels have equalized.

While FIG. 8 depicts the display of simulated initially unequal liquid levels on a computer monitor and FIG. 9 depicts the display of simulated finally equal liquid levels on the same computer monitor, it should be appreciated that the display device preferably also continuously displays the simulated liquid levels as they transition from the levels depicted in FIG. 8 to those depicted in FIG. 9.

In response to any change in the acceleration or rotation vector subsequent to liquid level equalization, fuel volume subsystems 52 and 54 will calculate new locations for the surface planes of liquid in Bays 1 and 2 respectively. In response to these new inputs at ports In1 and In2, the connection subsystem will again calculate and output (at ports Out1 and Out2) the initial flow rate from one bay to the other under these changed conditions. The connection subsystem 56 will then continue to calculate the flow rate until the liquid levels have again equalized.

The foregoing implementation enables dozens of mainframe Fortran programs to be replaced with a platform-independent toolkit designed to fit seamlessly into the MATLAB® computing environment. Two bays with uneven initial fuel levels are connected by an orifice. Solid modeling software is used to calculate the respective heights (relative to the elevation of the orifice) of the fuel in each bay and Simulink® handles the flow from one bay to the other. FIGS. 8 and 9 show a simulation for the first two bays of a 747-8 outboard wing tank. Units are in inches in the wing reference plane coordinate system.

Fuel height information is calculated by passing the fuel volume to the solid object for each bay and is returned as a three-dimensional locating vector for the fuel surface plane (the plane's normal in the case shown in FIG. 7 is just [0 0 1]). For the moment, the aircraft remains static, so the third element is extracted from this vector and used as the height of the fuel plane, from which the z-location of the orifice is subtracted to get the relative fuel height for calculating head pressure. Conversion to head is accomplished by a series of gain blocks representing the appropriate conversions, i.e., P=rho*g*h.

Up to this point, everything is accomplished either by calls to the solid modeling software or using regular Simulink® signals, which are purely mathematical; it is after head is determined that the signal is converted into the "Physical Signals" used by Simscape™. The converted pressure signal is used to drive a Hydraulic Pressure Source which is connected on one end to an Atmospheric Reference and on the other to an orifice. The orifice is then connected to a mirror configuration in the second bay. An exemplary fuel volume subsystem is depicted symbolically in FIG. 10. A Flow Rate Sensor is used to determine the resultant flow through the physical system, which is then converted back to a regular Simulink® signal in inches^3/s and integrated to provide volume updates to the solid object representing the partially filled bay.

Simulations can be conducted in which, following refueling, the fuel volume is preserved while aircraft conditions change. To approximate a takeoff roll, the "normal" input to .slice or .cut methods is a total acceleration vector defined in MATLAB® as [−accel 0 1], where "accel" is the forward (x-direction) acceleration in g's. A custom MATLAB® function called "findFuelPlane" is used to determine the locating point for the fuel plane.

Further, the simulation may include changing pitch of the airplane (up/down). In this case, the fuel tank orientation relative to gravity is varying in time as well as the total acceleration vector. This is accomplished using the solid object's "rotate" method; MATLAB® function "angle2dcm" (aerospace toolbox) was useful for quickly generating the required directional cosine matrix input.

Various methods for integrating solid model objects into Simulink® have been successfully tried. In the method disclosed above, a "Level-2 M-File S-Function" block was used. Other methods used an "Embedded Matlab Function" block or a "Matlab Fcn" block. All three blocks subsequently call a the function "findFuelPlane", which in turn locates the fuel plane for an input fuel volume and dynamic conditions using a solid model object.

Because of the Java nature of the objects, all three of these methods basically do the same thing—that is, they execute the findFuelPlane function in the regular MATLAB® engine. Simulink® does not digest Java on its own, which limits the sort of acceleration options that can be applied to speed up a simulation later on. Even in the Embedded MATLAB® Function, which pre-compiles m-code into C equivalent for faster execution, the findFuelPlane function is declared as "extrinsic," meaning it is handed off to the regular MATLAB® engine at run-time rather than attempting to pre-compile it.

Figure 10:
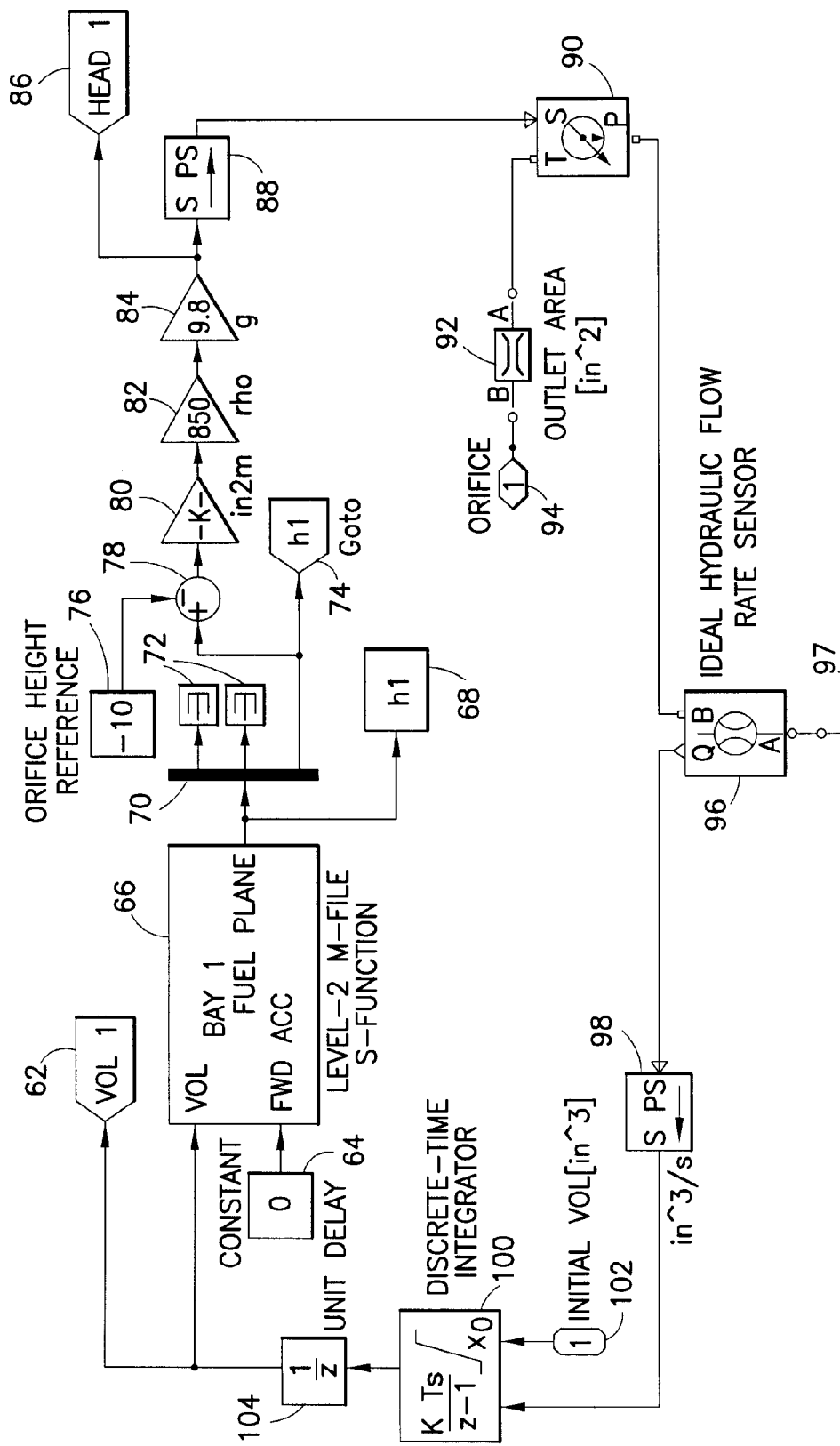
FIG. 10 is a block diagram representing calculations performed using commercially available software (i.e., Simulink®, developed by MathWorks) for modeling, simulating and analyzing liquid flow between connected compartments or bays of a containment vessel.

FIG. 10 is a block diagram representing calculations performed using Simulink® for modeling, simulating and analyzing liquid flow between connected compartments or bays of a containment vessel.

The block 62 labeled "Vol 1" in FIG. 10 is a "Goto" block, which routes the signal to a corresponding "From" block. From and Goto blocks allow you to pass a signal from one block to another without actually connecting them. In this case the signal is simply routed to a data capture section to be plotted.

The block 64 labeled "Constant" is a Constant block, in this case set to 0.0, which is supplying the "Fwd Acc" or forward acceleration component of a total acceleration vector to the tank model.

The block 66 labeled "Level-2 M-file S-Function" is exactly that. This S-function provides the interface to the solid modeling software, and is an older version of the block previously described.

The block 68 labeled "h1" in FIG. 10 is a "To Workspace" block; it stores data in program memory in the MATLAB® workspace for use after the simulation ends.

The dark bar 70 directly to the right of block 66 is a Demux block. The Demux block 70 extracts the components of an input signal and outputs the components as separate signals. The output signals are ordered from top to bottom output port. The output "Fuel Plane" from the S-function is a three-dimensional array (representing the x,y,z locating point of the fuel plane), and in the particular simulation depicted in FIG. 10, we were only interested in the third element, the z-value or height of the liquid. Thus, the top two signals exiting the Demux block end in "Terminator" blocks 72, while the third proceeds to other operations. A "Terminator" block terminates an unconnected output port.

The block 74 labeled "Goto", with interior label "h1" is a Goto block that routes to a data capture and plot section, not shown.

The block 76 labeled "orifice height reference" is a Constant block, in this case providing a z-value (height) for the orifice through which liquid flow is calculated. The output from block 76 is subtracted from the fuel plane z-value using the circular "Sum" block 78, generating an output that represents the height of the liquid above the orifice, also called "head height." In this case, the head height signal represents a height in inches.

The head height signal is then run through a series of conversion multipliers using "Gain" blocks, multiply an input by a constant value (gain). The block 80 labeled "in2m" is a unit conversion from inches to meters; the block 82 labeled "rho" is a multiplier for the liquid density; and the block 84 labeled "g" is a multiplier for acceleration due to gravity in $m/s^2$. The output from these multipliers is the "head pressure" in Pascals.

The block 86 labeled "HEAD 1" is a Goto block that routes head pressure to the data capture and plot section.

The block 88 with internal labeling "S PS" is a "Simulink to Physical Signal" conversion block. It converts a regular Simulink® signal, the units of which are implicit, into a Simscape™ Physical Signal, the units of which are explicit. In this case the Physical signal is declared in Pascals. Simulink® blocks represent basic mathematical operations. Simscape™ technology enables the creation of a network representation of the system under design, based on the Physical Network approach. According to this approach, a system can be represented as functional elements that interact with each other by exchanging energy through their ports.

Still referring to FIG. 10, the pressure signal output of the S-PS block 88 enters into a "Hydraulic Pressure Source" block 90. A Hydraulic Pressure Source block represents an ideal source of hydraulic energy that is powerful enough to maintain specified pressure at its outlet regardless of the flow rate consumed by the system. Block connections T and P correspond to the hydraulic inlet and outlet ports, respectively, and connection S represents a control signal port. The hydraulic pressure source 90 provides an ideal pressure differential between ports P and T which is directly proportional to the input signal S. Block 90 implements the calculated head pressure of the fuel above the orifice in the fluid network.

The port T of the pressure source 90 is defined as the "lower" side of the pressure source. It is connected to a block 92 labeled "Outlet Area [in^2]". This is an orifice block which models the pressure and flow rate effects of a hydraulic orifice with constant cross-sectional area. The Outlet Area block 92 is connected to an "Outport" 94 that connects it to another diagram which is a mirror image of this one, and calculates the head pressure in Bay 2 rather than Bay 1.

The block 96 labeled "Ideal Hydraulic Flow Rate Sensor" simulates an ideal flow meter, that is, a device that converts volumetric flow rate through a hydraulic line into a control signal proportional to this flow rate. The sensor is ideal because it does not account for inertia, friction, delays, pressure loss, etc. Block 96 measures the flow rate of the physical network as it crosses from port A to port B. The ports are connected to a hydraulic reference 97 on one side and the head pressure source 90 on the other. This sequence can be thought of as beginning at atmospheric pressure above the liquid (the hydraulic reference), then adding the head pressure (weight of the liquid above the orifice), before passing through an orifice. The larger the head pressure, the greater the induced flow through the orifice. Connection Q is a physical signal port that outputs the flow rate value.

The 98 block labeled "in^3/s" is a "Physical Signal to Simulink" converter block. In this case it is outputting a Simulink® signal (i.e., the units of which are implicit) that represents flow rate in cubic inches per second. This flow rate enters a "Discrete-Time Integrator" block 100 that integrates the flow rate into Bay 1 to keep track of the total volume of liquid inside. Block 102 represents the input of the initial volume of fuel in Bay 1 into block 100.

The final block 104 in the loop is a "Unit Delay", the function of which is to delay the output from the integrator 100 one time step before it enters the volume input of the tank calculator S-function 66. This breaks what would otherwise be an algebraic loop, where the output of the block is used to define its input in the same time step.

In summary, the loop calculates the head pressure of liquid above an orifice. This pressure then determines the flow rate through that orifice, and that flow rate adds or subtracts liquid volume from the container, which in turn affects height of the liquid in the container, and thus the head pressure. In practice, any difference liquid height between the two compartments on either side of the orifice will induce a flow through the orifice until the heights equalize.

Figure 11:
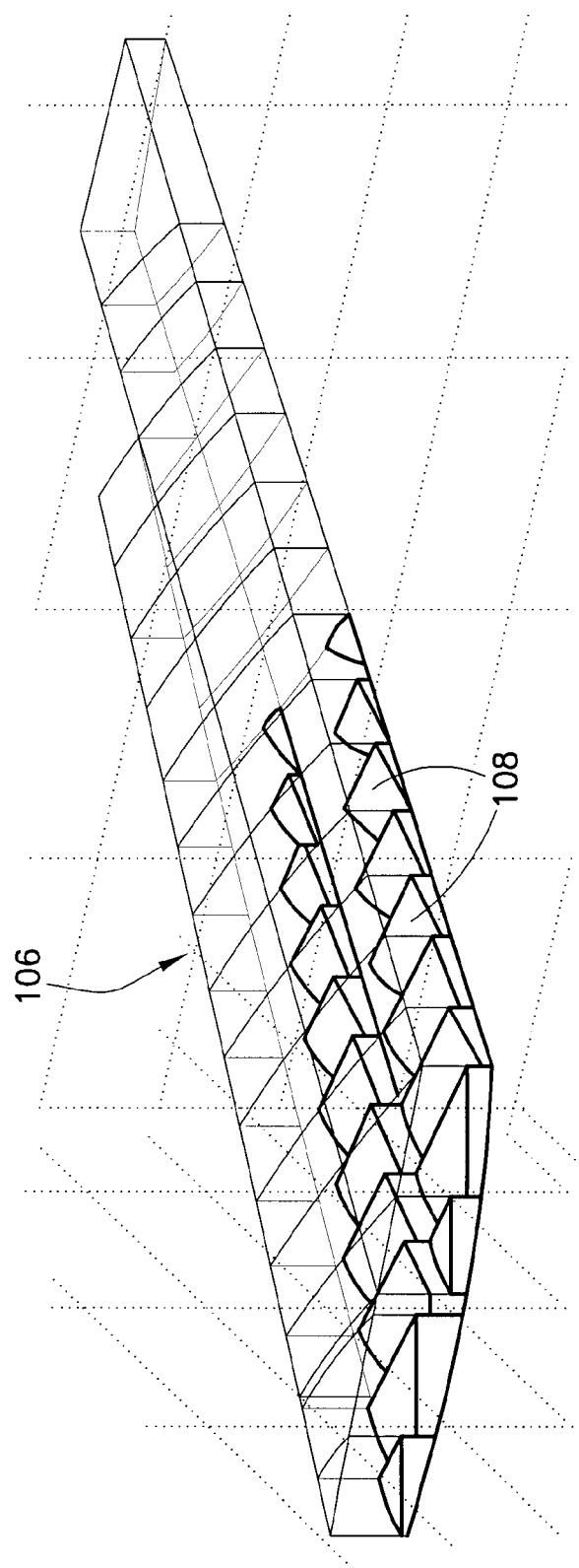
FIG. 11 is a three-dimensional illustration showing multiple bays of a fuel tank wherein liquid becomes trapped by interior baffles.

As previously disclosed, the foregoing calculations can be extended to encompass a simulated fuel tank having a sequence of at least three communicating bays, each bay being at least partially filled with liquid fuel. FIG. 11 shows an image representing fuel 108 in a 747 wing tank 106. This fuel tank has multiple communicating bays which can be simulated using the techniques disclosed herein.

A proof of concept was implemented in solid modeling software using Jython and MATLAB®. Jython is an implementation of the Python programming language written in Java. A subsequent embodiment of the invention used MAT- LAB® to drive the solid modeling software through its Java API to compute the liquid levels.

The solid modeling software provides the capability to represent solid models as boundary representations and perform regularized Boolean operations on solid models such as subtract, add and intersect, and the capability to compute exact integral properties on solid models by implementing the divergence theorem. In particular, the solid model representation of the containment vessel can be used to facilitate derivation of vessel properties.

For example, the solid model representations of liquid and containment vessel can be used to derive the exposed liquid area inside the containment vessel, which is simply the area of the top face of the solid model representation of the liquid. This property is important for estimating evaporation. Evaporation of fuel is calculated using the Antoine equation and the ideal gas law: The Antoine equation is a vapor pressure equation and describes the relation between vapor pressure and temperature for pure components:

$$\log_{10} p = A - \frac{B}{C+T}.$$

where p is the vapor pressure, T is temperature and A, B and C are component-specific constants. The August equation assumes a temperature-independent heat of vaporization. The evaporation (more technically the "evolution") of atmospheric gases dissolved in a liquid is estimated using Ostwald solubility coefficients and the ideal gas law. Both effects must be considered when analyzing fuel tank flammability, that is, when are the vapors in a fuel tank at risk of ignition? Flammability analysis is required to certify the effectiveness of a fuel tank Flammability Reduction System (FRS). The federal aviation regulation FAR 25.981 explains the mandate for an FRS.

The solid model representations of liquid and containment vessel can also be used to derive the wetted area (the area which is touched by liquid) by computing the areas of all the faces of the solid model representation of the liquid that touches the vessel faces. The wetted area of the vessel is used primarily in heat transfer calculations to predict fuel tank temperatures.

Many commercial aircraft have a set of "dip-stick" indicators that provide a backup to the electronic Fuel Quantity Indication System (FQIS). In the event that fuel quantity cannot be determined by the FQIS, aircraft operators can manually read the fuel height information in various parts of the tank from these "dip-stick" indicators, and then use that information with a set of pre-stored tables (provided by the aircraft manufacturer) to determine the fuel quantity in the tank. The solid model representations of liquid and containment vessel can be used to derive dip stick levels (the amount a dip stick is submerged in liquid) by intersecting a solid model representation of the dipstick with the solid model representation of the liquid (this is used to calibrate the dip sticks to indicate the volume of liquid). The calibration process is one of fine tuning and verifying the tables to ensure accurate prediction of volume based on "dip stick" readings. Computer models, based on the invention disclose herein, can be used to generate the tables.

Further, the solid model representations of liquid and containment vessel can be used to derive the amount of trapped liquid. In designing an aircraft fuel tank and system, it is imperative to reduce the locations where liquid can become trapped (i.e., not drained during normal operation) to a minimum. Not only are trapped fuel locations dead weight that cannot be used by the engines, but they provide the potential for water to collect (becoming a potential corrosion problem) and under certain circumstances freeze into ice. Solid ice can present a blocking hazard that may prevent fuel from reaching the engines.

As disclosed above with reference to FIGS. 7-10, the solid model representations of liquid and containment vessel can be used to derive the amount of liquid transferred from one compartment to another when the orientation of the vessel changes. The transfer rate must be shown to be adequately fast to prevent the buildup of fuel on one side of a tank division during normal operations, especially during refueling when a large volume of fuel is being rapidly deposited into one part of the tank and must freely flow to the others. Excessive fuel "unleveling" across a tank baffle can create undesirable structural stresses. On the other hand, the baffles must be restrictive enough to prevent all of the fuel from crashing simultaneously into primary structure under a high acceleration crash scenario.

The solid model representations of liquid and containment vessel can be used to derive the weight distribution of the liquid in the containment vessel. On an aircraft, center-of-gravity management is an important component of aircraft performance, efficiency, and handling qualities. A full fuel tank represents a sizable proportion of overall vehicle weight, and small shifts in the distribution of that weight can have significant impacts on the factors mentioned above. It is important to make sure that the fuel center of gravity remains within safe bounds under all operating conditions, and ideally that it is optimized so that the aircraft can achieve peak efficiency.

Algorithms for computing the volume, moments of inertia, and other properties of geometrically complex solids are well known. For example, algorithms for computing the volume and other integral properties of solid objects are disclosed by Lee and Requicha in Technical Memo 35a from the Production Automation Project at The University of Rochester (March 1981); in "Algorithms for Computing the Volume and Other Integral Properties of Solids. I. Known Methods and Open Issues", Communications of the ACM, Vol. 25, No. 9, pp. 635-641 (September 1982); and in "Algorithms for Computing the Volume and Other Integral Properties of Solids. II. A Family of Algorithms Based on Representation Conversion and Cellular Approximation", Communications of the ACM, Vol. 25, No. 9, pp. 642-650 (September 1982). Computing the integral properties of solid objects having curved faces is more difficult, but has also been solved. See, e.g., pages 603-622 of Handbook of Computer Aided Geometric Design, G. Farin et al. (editors), Elsevier B. V., Chapter 24—Geometry Processing, Thomas A. Grandine (2002).

The invention has application in any situation that requires accurate computation of fluid levels in complex-shaped containment vessels and vessels that change orientations or are subject to dynamic forces. This includes domestic and foreign air and spacecraft companies, car and truck companies, ships and boats (e.g., oil tankers), and possibly any one interested in correlating fluid levels and volume amounts in geological formations such as water reservoirs and oil deposits.

Savings will be derived by increased accuracy to determine fluid levels in aircraft wings. Any discrepancy between computed and actual values detected during physical calibration costs several orders of magnitude more to correct than when caught early in the design.

Direct use of solid models (e.g., imported from CATIA) will save man-weeks per model currently spent turning those solids into highly formatted, much reduced arrays of point data to feed the current tool.

Improved architecture (Jython/Java API and solid modeling software) will greatly improve integration of analysis computing processes. This currently requires a significant amount of error-prone and time-consuming manual intervention between about two dozen applications.

The disclosed embodiments provide clear benefits when there is a need to simulate liquid containment behavior, i.e., when a physical system is not available, which includes analysis software, system test equipment and flight simulators. For example, the disclosed application: (1) improves accuracy of analysis tools and reduces the need for testing and post-test calibration of documentation (e.g., on new airplane programs); (2) produces a common enterprise-wide module for computing liquid levels to facilitate communicating results between business units (for example, this tool can be used for more accurate load computations); (3) can be applied beyond wing volume computations; (4) eliminates time spent on data transfers and reduces errors due to data transfers; and (5) reduces maintenance efforts of legacy code.

The disclosed embodiments can also be used to reduce cycle times in calibration of fuel gauges and improves estimation of unusable fuel. Greater confidence in the accuracy of these analyses will reduce dependency on testing, shorten development time by reducing post-test calibration of certification data, and reduce the risk of potential redesign. Shortened turnaround of analysis results during aircraft design will catch design issues sooner, and allow more efficient exploration of alternative designs.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The method claims set forth hereinafter should not be construed to require that the recited steps be performed in the order recited. In particular, no such inference should be drawn from any alphabetical listing of steps.

The invention claimed is:

1. A method, performed by a computer system, for calculating a liquid surface plane location in a containment vessel, comprising:
 (a) storing a first set of data comprising a solid model representation of said containment vessel;
 (b) storing a second set of data representing a spatial orientation of said containment vessel;
 (c) storing a third set of data representing a magnitude and direction of acceleration of said containment vessel;
 (d) storing liquid volume data representing a volume of liquid in said containment vessel; and
 (e) calculating a location of a surface plane of said liquid in said containment vessel using at least said first through third sets of data and said liquid volume data;
 wherein step (e) comprises:
 (i) selecting a current guess for the location of said liquid surface plane;
 (ii) calculating the volume of liquid below the current guess for the liquid surface plane location using regularized solid modeling operations;
 (iii) comparing the volume of liquid below the current guess for the liquid surface plane location to the volume of liquid represented by said liquid volume data;
 (iv) if the volume of liquid below the current guess for the liquid surface plane location is not sufficiently close to the volume of liquid represented by said liquid volume data, using a numerical method to select a different current guess for the liquid surface plane location; and
 (v) repeating steps (ii) through (iv) until the volume of liquid below the current guess for the liquid surface plane location is sufficiently close to the volume of liquid represented by said liquid volume data.

2. The method as recited in claim 1, wherein said numerical method comprises finding successively better approximations to the zero of a function equal to a difference between the volume of liquid below the current guess for the liquid surface plane location and the volume of liquid represented by said liquid volume data.

3. The method as recited in claim 1, further comprising:
 storing a fourth set of data representing an area and an elevation of a port connected to said containment vessel; and
 calculating a rate of liquid flow into or out of said containment vessel via said port using at least said first through fourth sets of data and said liquid volume data.

4. The method as recited in claim 1, further comprising deriving a vessel property selected from the following group: the exposed liquid area; the wetted area of said containment vessel; and the weight distribution of the liquid in said containment vessel.

5. The method as recited in claim 1, further comprising intersecting a solid model representation of a dipstick with a solid model representation of said liquid in said containment vessel.

6. A method, performed by a computer system, for simulating the behavior of liquid in a containment vessel comprising first and second compartments that communicate via an interconnection, comprising:
 (a) storing a first set of data comprising a solid model representation of said first compartment;
 (b) storing a second set of data comprising a solid model representation of said second compartment;
 (c) storing a third set of data representing a spatial orientation of said containment vessel;
 (d) storing a fourth set of data representing a magnitude and direction of acceleration of said containment vessel;
 (e) storing a fifth set of data representing an area and an elevation of said interconnection between said first and second compartments;
 (f) storing first liquid volume data representing a volume of liquid in said first compartment;
 (g) storing second liquid volume data representing a volume of liquid in said second compartment;
 (h) calculating a location of a first surface plane of liquid in said first compartment using said first, third and fourth sets of data and said first liquid volume data;
 (i) calculating a location of a second surface plane of liquid in said second compartment using at least said second, third and fourth sets of data and said second liquid volume data;
 (j) after steps (h) and (i), calculating a differential pressure due to a difference between said locations of said first and second liquid surface planes in said first and second compartments; and
 (k) calculating a rate of liquid flow from one of said first and second compartments to the other using at least said differential pressure and said fifth set of data, wherein step (h) comprises:
(i) selecting a current guess for the location of said first liquid surface plane in said first compartment;
(ii) calculating the volume of liquid below the current guess for the location of said first liquid surface plane in said first compartment using regularized solid modeling operations;
(iii) comparing the volume of liquid below the current guess for the location of said first liquid surface plane in said first compartment to the volume of liquid represented by said first liquid volume data;
(iv) if the volume of liquid below the current guess for the location of said first liquid surface plane is not sufficiently close to the volume of liquid represented by said first liquid volume data, using a numerical method to select a different current guess for the location of said first liquid surface plane; and
(v) repeating steps (ii) through (iv) until the volume of liquid below the current guess for the location of said first liquid surface plane is sufficiently close to the volume of liquid represented by said first liquid volume data.

7. The method as recited in claim 6, further comprising:
deriving a first set of image data representing said first and second compartments of said containment vessel having said spatial orientation;
deriving a second set of image data representing said first liquid surface plane in said first compartment;
deriving a third set of image data representing said second liquid surface plane in said second compartment; and
displaying said second and third sets of image data in intersecting relationship with said first set of image data.

8. The method as recited in claim 6, further comprising the step of displaying image data representing changing levels of liquid in said first and second compartments.

9. The method as recited in claim 6, wherein said numerical method comprises finding successively better approximations to the zero of a function equal to a difference between the volume of liquid below the current guess for the location of said first liquid surface plane and the volume of liquid represented by said liquid volume data.

10. The method as recited in claim 6, further comprising deriving a vessel property selected from the following group: the exposed liquid areas in said first and second compartments; the wetted areas of said first and second compartments; the weight distribution of the liquid in said containment vessel; the amount of liquid trapped by said first and second compartments; and the amount of liquid transferred from one of said first and second compartments to the other when the orientation of said containment vessel changes.

11. A system for calculating a liquid surface plane location in a containment vessel, comprising a processor programmed to calculate a location of a surface plane of said liquid in said containment vessel using at least a first set of data comprising a solid model representation of said containment vessel, a second set of data representing a spatial orientation of said containment vessel, a third set of data representing a magnitude and direction of acceleration of said containment vessel, and liquid volume data representing a volume of liquid in said containment vessel,
wherein said calculating operation comprises:
(i) selecting a current guess for the location of said liquid surface plane;
(ii) calculating the volume of liquid below the current guess for the location of said liquid surface plane using regularized solid modeling operations;
(iii) comparing the volume of liquid below the current guess for the location of said liquid surface plane to the volume of liquid represented by said liquid volume data;
(iv) if the volume of liquid below the current guess for the location of said liquid surface plane is not sufficiently close to the volume of liquid represented by said liquid volume data, using a numerical method to select a different current guess for the location of said liquid surface plane; and
(v) repeating steps (ii) through (iv) until the volume of liquid below the current guess for the location of said liquid surface plane is sufficiently close to the volume of liquid represented by said liquid volume data.

12. The system as recited in claim 11, wherein said numerical method comprises finding successively better approximations to the zero of a function equal to a difference between the volume of liquid below the current guess for the liquid surface plane location and the volume of liquid represented by said liquid volume data.

13. The system as recited in claim 11, wherein said processor is further programmed to calculate a rate of liquid flow into or out of said containment vessel via a port using at least said first through third sets of data, said liquid volume data, and a fourth set of data representing an area and an elevation of said port.

14. The system as recited in claim 11, wherein said processor is further programmed to derive a vessel property selected from the following group: the exposed liquid area; the wetted area of said containment vessel; and the weight distribution of the liquid in said containment vessel.

15. The system as recited in claim 11, wherein said processor is further programmed to intersect a solid model representation of a dipstick with a solid model representation of said liquid in said containment vessel.

16. The system as recited in claim 11, further comprising a display device for displaying image data,
wherein said processor is further programmed to perform the following operations:
deriving a first set of image data representing said containment vessel having said spatial orientation; and
deriving a second set of image data representing said surface plane of liquid in said containment vessel, and
wherein said display device displays said second set of image data in intersecting relationship with said first set of image data.

17. A system for simulating the behavior of liquid in a containment vessel comprising first and second compartments that communicate via an inter-connection, comprising:
a processor programmed to perform the following operations:
(a) calculating a location of a first surface plane of liquid in said first compartment using at least a first set of data comprising a solid model representation of said first compartment, a second set of data representing a spatial orientation of said containment vessel, a third set of data representing a magnitude and direction of acceleration of said containment vessel, and first liquid volume data representing a volume of liquid in said first compartment;
(b) calculating a location of a second surface plane of liquid in said second compartment using at least a fourth set of data comprising a solid model representation of said second compartment, said second set of data representing said spatial orientation of said containment vessel, said third set of data representing a magnitude and direction of acceleration of said containment vessel, and second liquid volume data representing a volume of liquid in said second compartment;
(c) calculating a differential pressure due to a difference between said locations of said first and second liquid surface planes in said first and second compartments; and
(d) calculating a rate of liquid flow from one of said first and second compartments to the other using at least said differential pressure and a fifth set of data representing an area and an elevation of said interconnection between said first and second compartments, wherein operation (a) comprises:
(i) selecting a current guess for the location of said first liquid surface plane in said first compartment;
(ii) determining the volume of liquid below the current guess for the location of said first liquid surface plane in said first compartment using regularized solid modeling operations;
(iii) comparing the volume of liquid below the current guess for the location of said first liquid surface plane in said first compartment to the volume of liquid represented by said first liquid volume data;
(iv) if the volume of liquid below the current guess for the location of said first liquid surface plane is not sufficiently close to the volume of liquid represented by said first liquid volume data, using a numerical method to select a different current guess for the location of said first liquid surface plane; and
(v) repeating steps (ii) through (iv) until the volume of liquid below the current guess for the location of said first liquid surface plane is sufficiently close to the volume of liquid represented by said first liquid volume data.

* * * * *